US012650911B2

(12) United States Patent
Isoyama et al.

(10) Patent No.: US 12,650,911 B2
(45) Date of Patent: Jun. 9, 2026

(54) SYSTEM MONITORING APPARATUS, SYSTEM MONITORING METHOD, AND COMPUTER READABLE RECORDING MEDIUM

(71) Applicant: NEC Corporation, Tokyo (JP)

(72) Inventors: Kazuhiko Isoyama, Tokyo (JP); Junpei Kamimura, Tokyo (JP); Yoshiaki Sakae, Tokyo (JP)

(73) Assignee: NEC CORPORATION, Tokyo (JP)

( * ) Notice: Subject to any disclaimer, the term of this patent is extended or adjusted under 35 U.S.C. 154(b) by 445 days.

(21) Appl. No.: 18/038,082

(22) PCT Filed: Nov. 30, 2020

(86) PCT No.: PCT/JP2020/044544
§ 371 (c)(1),
(2) Date: May 22, 2023

(87) PCT Pub. No.: WO2022/113355
PCT Pub. Date: Jun. 2, 2022

(65) Prior Publication Data
US 2023/0418720 A1      Dec. 28, 2023

(51) Int. Cl.
*G06F 11/30*          (2006.01)
(52) U.S. Cl.
CPC ............................... *G06F 11/3006* (2013.01)
(58) Field of Classification Search
CPC ...... G06F 11/30; G06F 11/3006; G06N 20/00
USPC ........................................................ 702/186
See application file for complete search history.

(56) References Cited

U.S. PATENT DOCUMENTS

2016/0085655 A1*   3/2016   Ito ........................ G06F 11/3058
                                                              702/186
2017/0262818 A1*   9/2017   Horrell ................ G06Q 10/067
2019/0391968 A1   12/2019   Zoll et al.

FOREIGN PATENT DOCUMENTS

JP           2002-251374 A       9/2002
JP           2016-184358 A       10/2016

OTHER PUBLICATIONS

English translation of Written opinion for PCT Application No. PCT/JP2020/044544, mailed on Jan. 19, 2021.
International Search Report for PCT Application No. PCT/JP2020/044544, mailed on Jan. 19, 2021.

* cited by examiner

*Primary Examiner* — John H Le
(74) *Attorney, Agent, or Firm* — Sughrue Mion, PLLC

(57)          ABSTRACT

A system monitoring apparatus comprising: a complementing unit that generates complemented node information by complementing, based on a complementing model trained using information collected in a testing system using a monitoring command and an agent, first node information collected in an operated system using the monitoring command; and
an estimating unit that estimates the probability of a link being present between nodes by inputting the complemented node information to a link estimating model trained using the information collected in the testing system using the monitoring command and the agent.

12 Claims, 14 Drawing Sheets

Fig.3

```
> nestat protocol        local address        external address        status
TCP             10.20.2.109:1543     52.230.80.159:https      ESTABLISHED

| KEY INFORMATION | COMPLEMENTING INFORMATION |
|---|---|
| ⋮ | ⋮ |
| db_child * | db_parent * |
| 10.20.2.109: * , 52.230.80.159: * | communication amount |
| ⋮ | ⋮ |

Fig.5

```
$ sudo ps aux

USER  PID    %CPU  %MEM  VSZ   RSS   TTY   START      TIME   COMMAND
root  1001   0     0     0     0     ?     22:03      0:00   db_parent
root  1002   0     0     0     0     ?     22:04      0:00   db_child1242

| node ID | NODE INFORMATION | | |
|---------|------------------|---|---|
| ... | ... | | |
| E1 | PATH | FILE NAME | |
| ... | ... | | |
| E2 | TRANSMISSION SOURCE IP | TRANSMISSION SOURCE PORT | DESTINATION IP | DESTINATION PORT | ... |
| ... | ... | | |
| E3 | PROCESS NAME | ... | |
| E4 | PROCESS NAME | ... | |
| ... | ... | | |

| LINK ID | NODE ID1 | NODE ID2 | LINK TYPE | PRESENCE PROBABILITY |
|---------|----------|----------|-----------|----------------------|
| ⋮ | ⋮ | ⋮ | ⋮ | ⋮ |
| L1 | E3 | E4 | A1 | P1 |
| ⋮ | ⋮ | ⋮ | ⋮ | ⋮ |

| VERTEX | EDGE |
|--------|------|
| ⋮ | ⋮ |
| E1 | E2:L0、 E3:L1、 E3:L3 |
| E2 | E1:L0、 E3:L2 |
| E3 | E1:L1、 E1:L3、 E2:L2 |
| E4 | — |
| ⋮ | ⋮ |

1

SYSTEM MONITORING APPARATUS, SYSTEM MONITORING METHOD, AND COMPUTER READABLE RECORDING MEDIUM

This application is a National Stage Entry of PCT/JP2020/044544 filed on Nov. 30, 2020, the contents of all of which are incorporated herein by reference, in their entirety.

TECHNICAL FIELD

The invention relates a system monitoring apparatus and a system monitoring method for monitoring a system, and further relates to a computer readable recording medium that includes recorded thereon a program for realizing the system monitoring apparatus and the system monitoring method.

BACKGROUND ART

Conventionally, there is a known technique of checking a system using an agent, etc., when performing a check as to whether there is a vulnerability in the system.

Patent Document 1 discloses a method for detecting a sign that a website will be attacked and minimizing damage by taking countermeasures before the attack is initiated. According to Patent Document 1, first, if a monitor agent analyzes a log of an entity and detects an abnormality, the monitor agent communicates data relating to the abnormality to a control manager. Next, based on the communicated data, the control manager selects a countermeasure that corresponds to the data from a database. Subsequently, the control manager causes an action agent that is asked to execute the countermeasure to execute the countermeasure.

LIST OF RELATED ART DOCUMENTS

Patent Document

Patent Document 1: Japanese Patent Laid-Open Publication No. 2002-251374

SUMMARY

Technical Problems

However, if a system is monitored using a monitor agent or the like as in Patent Document 1, the system may become unstable or the load may increase because the monitor agent needs to access a kernel module. Thus, there is a demand for the development of a method that allows a system to be monitored without using a monitor agent.

As one aspect, an example object of the invention is to provide a system monitoring apparatus, a system monitoring method, and a computer readable recording medium for accurately monitoring a system without accessing a kernel module.

Solution to the Problems

In order to achieve the example object described above, a system monitoring apparatus according to an example aspect includes:

a complementing unit that generates complemented node information by complementing, based on a complementing model trained using information collected in a testing system using a monitoring command and an agent, first node information collected in an operated system using the monitoring command; and an estimating unit that estimates the probability of a link being present between nodes by inputting the complemented node information to a link estimating model trained using the information collected in the testing system using the monitoring command and the agent.

Also, in order to achieve the example object described above, a system monitoring method according to an example aspect includes:

generating complemented node information by complementing, based on a complementing model trained using information collected in a testing system using a monitoring command and an agent, first node information collected in an operated system using the monitoring command; and estimating the probability of a link being present between nodes by inputting the complemented node information to a link estimating model trained using the information collected in the testing system using the monitoring command and the agent.

Furthermore, in order to achieve the example object described above, a computer-readable recording medium according to an example aspect includes a program recorded on the computer-readable recording medium, the program including instructions that cause the computer to carry out:

generating complemented node information by complementing, based on a complementing model trained using information collected in a testing system using a monitoring command and an agent, first node information collected in an operated system using the monitoring command; and estimating the probability of a link being present between nodes by inputting the complemented node information to a link estimating model trained using the information collected in the testing system using the monitoring command and the agent.

Advantageous Effects of the Invention

One aspect is that, it is possible to accurately monitoring a system without accessing a kernel module.

BRIEF DESCRIPTION OF THE DRAWINGS

FIG. 3 is a diagram for describing one example of information acquired using the monitoring command.

FIG. 4 is a diagram for describing one example of the complementing model.

FIG. 5 is a diagram for describing one example of information acquired using the monitoring command.

FIG. 6 is a diagram for describing one example of the link estimating model.

FIG. 7 is a diagram for describing one example of the link estimating model.

FIG. 8 is a diagram for describing one example of the graph information.

EXAMPLE EMBODIMENT

Figure 1:
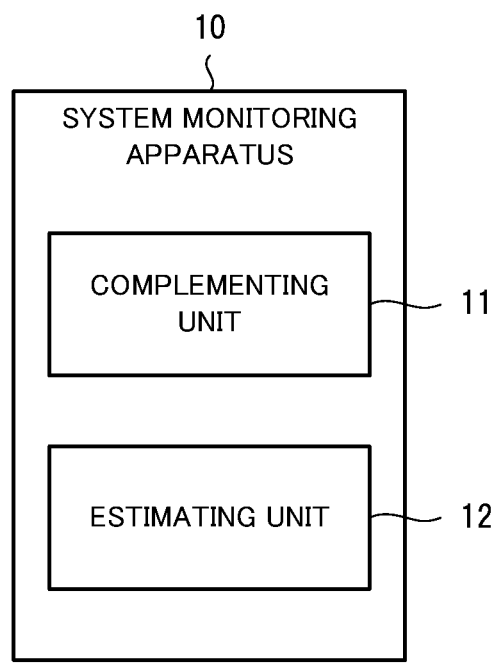
FIG. 1 is a diagram for describing one example of the system monitoring apparatus.

In the following, an example embodiment will be described with reference to the drawings. Note that, in the drawings described in the following, the same reference symbol is given to elements having the same function or corresponding functions, and repetitive description thereof may be omitted.

Example Embodiment

The configuration of a system monitoring apparatus 10 in the present example embodiment will be described with reference to FIG. 1. FIG. 1 is a diagram for describing one example of the system monitoring apparatus.
[Apparatus Configuration]

The system monitoring apparatus 10 illustrated in FIG. 1 is an apparatus for accurately monitoring a system without accessing a kernel module. Furthermore, as illustrated in FIG. 1, the system monitoring apparatus 10 includes a complementing unit 11 and an estimating unit 12.

The complementing unit 11 generates complemented node information by complementing, based on a complementing model trained using information collected in a testing system using a monitoring command and an agent, node information (first node information) collected in an operated system using only the monitoring command.

The testing system is a system that is constructed by simulating a target system (operated system) used in actual operation. Furthermore, hosts used in the testing system have the agent installed therein. Note that the testing system will be described in detail later.

The monitoring command is a command for executing a program that is provided in software such as an operating system (OS) and that is used to monitor a system.

Specifically, when the monitoring command is input to collect predetermined information, a program corresponding to the input monitoring command is executed, and information relating to nodes (node information) is collected from a system.

The node information is information relating to nodes such as processes, networks, or files, for example. In the node information, for each node, the node and one or more pieces of node-related information corresponding to the node are associated with one another. For example, if node information of each node is expressed as a record (or row), each piece of information relating to the node is expressed as a field (or cell) in the record. Note that information relating to a node will be referred to hereinafter as field information.

The agent is software used to acquire information relating to a system. For example, the agent acquires node information relating to the system by accessing an OS kernel module. However, if the agent is used, the system may become unstable or the load may increase.

The complementing model is information obtained by, based on node information (second node information) collected in the testing system using the monitoring command and node information (third node information) collected in the testing system using the agent, performing training for learning the relationship between the second node information and the third node information.

Training (learning) results in the generation of rule information in which key information serving as a key for selecting first node information and complementing information for complementing the first node information are associated with one another. The complementing model includes one or more pieces of rule information.

The complementing information is information that is added to the first node information. The complementing information is information that can be acquired using the agent but cannot be acquired using the monitoring command.

The complemented node information is information in which the complementing information is added to the first node information. The complemented node information includes information equivalent to that included in the third node information acquired using the agent.

Note that the method for training the complementing model and the details of the model will be described later.

As described above, in the present example embodiment, the first node information collected from the operated system using the monitoring command, without using the agent and accessing an OS kernel module, can be expanded to information equivalent to node information collected using the agent.

The estimating unit 12 estimates the probability of a link (relationship) being present between nodes by inputting the complemented node information to a link estimating model trained using the information collected in the testing system using the monitoring command and the agent.

The link estimating model is information obtained by, based on the node information (second node information) collected in the testing system using the monitoring command and the node information (third node information) collected in the testing system using the agent, performing training to learn the probability of links being present between nodes.

Note that the method for training the link estimating model and the details of the model will be described later.

As described above, in the present example embodiment, the probability of a link being present between nodes can be estimated using the complemented node information obtained by expanding the first node information, which is collected from the operated system using the monitoring command, without using the agent and accessing an OS kernel module.
[System Configuration]

Figure 2:
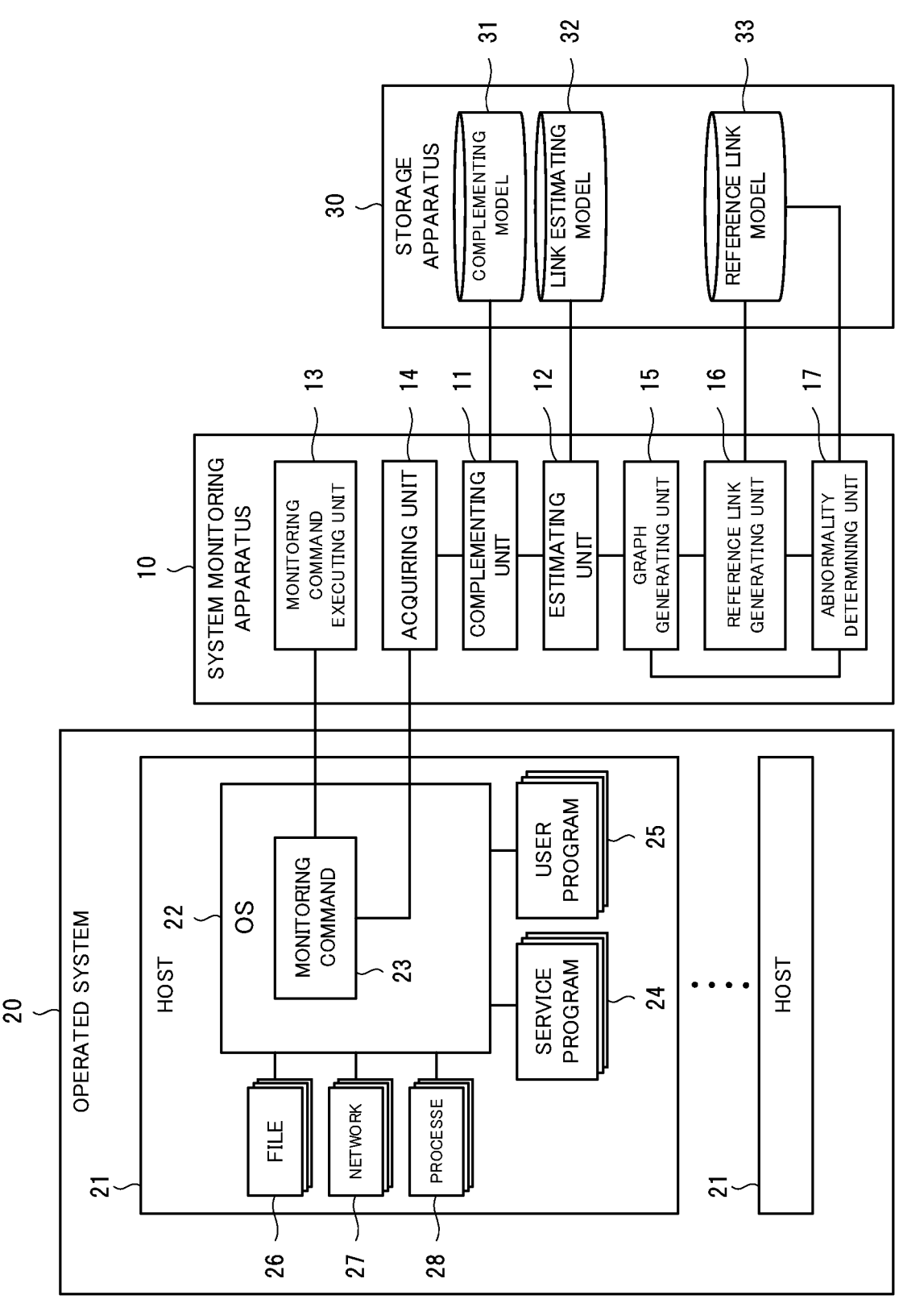
FIG. 2 is a diagram for describing one example of a system including the system monitoring apparatus.

Next, the configuration of the system monitoring apparatus 10 in the present example embodiment will be described in detail with reference to FIG. 2. FIG. 2 is a diagram for describing one example of a system including the system monitoring apparatus. The system illustrated in FIG. 2 includes the system monitoring apparatus 10, an operated system 20, and a storage apparatus 30.

The system monitoring apparatus 10 includes a monitoring command executing unit 13, an acquiring unit 14, the complementing unit 11, the estimating unit 12, a graph generating unit 15, a reference link generating unit 16, and an abnormality determining unit 17.

For example, the system monitoring apparatus 10 is a central processing unit (CPU), a programmable device such as a field-programmable gate array (FPGA), a graphics processing unit (GPU), or a circuit or an information processing apparatus, such as a server computer, a personal computer, or a mobile terminal, having one or more of the above mounted thereon. Note that the system monitoring apparatus 10 will be described in detail later.

The operated system 20 includes one or more hosts 21. For example, each of the hosts 21 is an information processing apparatus, a storage apparatus, a communication control apparatus, or the like. The hosts 21 are connected via networks. In the example illustrated in FIG. 2, an OS 22, service programs 24, user programs 25, etc., are illustrated as software executed in the hosts 21.

Note that the hardware and software included in the operated system 20 illustrated in FIG. 2 may be divided according to individual functions, and the functions according to which the hardware and software are divided may be expressed as a plurality of elements. Links are present between the elements.

Furthermore, while an example of the operated system 20 in which hosts are used is illustrated in the example illustrated in FIG. 2, the operated system 20 may be configured as a network constructed by a social networking service (SNS) or the like.

A monitoring command 23 indicates a command that is input from the system monitoring apparatus 10 and that is for causing a program for collecting information from the operated system 20 to be executed. When the monitoring command 23 is input, information relating to files, networks, processes, or the like is collected as a result of the program for collecting information being executed. In the example illustrated in FIG. 2, information relating to files 26, networks 27, processes 28, or the like is collected.

The storage apparatus 30 stores therein a complementing model 31, a link estimating model 32, a reference link model 33, etc. For example, the storage apparatus 30 is a storage apparatus such as a database or a server computer. Note that, while the above-described models are stored in one storage apparatus 30 in the example illustrated in FIG. 2, the above-described models may be stored in one or more different storage apparatuses.

The system monitoring apparatus will be described in detail.

The monitoring command executing unit 13 inputs a predetermined monitoring command 23 to the hosts 21 at a preset interval or a preset date/time (year/month/date/time), and thereby causes the OS 22 to execute the program executed by the predetermined monitoring command. If the OS 22 is Linux (registered trademark) for example, a command such as "ps" or "pstree" is input in regard to processes, for example. For example, a command such as "iostat" is input in regard to input/output. For example, a command such as "netstat" or "tcpdump" is input in regard to networks.

The acquiring unit 14 acquires, from the hosts 21, the information collected in response to execution of the monitoring command 23. For example, information (files 26, networks 27, or processes 28) relating to the above-described files, networks, processes, or the like corresponding to the executed monitoring command is acquired. Specifically, snapshots, etc., are acquired.

The complementing unit 11 generates complemented node information by selecting complementing information for complementing the first node information from the complementing model 31, and adding the complementing information to the first node information.

Specifically, first, the complementing unit 11 acquires information including the first node information from the acquiring unit 14. Next, the complementing unit 11 extracts the first node information. Subsequently, the complementing unit 11 selects complementing information relating to the extracted first node information from the complementing model 31. Next, the complementing unit 11 generates complemented node information by adding the complementing information to the extracted first node information.

An example of the complementing unit will be described.

Suppose that, first, the monitoring command executing unit 13 inputs the "netstat" command as the monitoring command 23 to the hosts 21, and the acquiring unit 14 acquires network-related information as illustrated in FIG. 3. FIG. 3 is a diagram for describing one example of information acquired using the monitoring command.

In such a case, the complementing unit 11 extracts "10.20.2.109:1543" and "52.230.80.159:https", which are pieces of information relating to a "local address" (transmission source IP and transmission source port) and an "external address" (destination IP and destination port), as the first node information from the information illustrated in FIG. 3.

Next, using the first node information "10.20.2.109:1543" and "52.230.80.159:https" as a key, the complementing unit 11 detects key information "10.20.2.109:*" and "52.230.80.159:*" that is similar to the first node information by referring to the complementing model 31 illustrated in FIG. 4. FIG. 4 is a diagram for describing one example of the complementing model.

As illustrated in FIG. 4, the complementing model 31 includes pieces of information in which information "key information" that serves as a key and that is field information with a regular expression, and information "complementing information" with a regular expression that is for complementing first node information are associated with one another. The symbol "*" (asterisk) indicates a regular expression. The reason why regular expressions are adopted is because port numbers, for example, change each time, and such changes are to be accommodated.

Note that the complementing model 31 is generated using the later-described testing system and model generation apparatus.

Next, the complementing unit 11 selects the complementing information "communication amount" associated with the detected key information "10.20.2.109:*" and "52.230.80.159:*" by referring to the complementing model 31 illustrated in FIG. 4. In the "communication amount", a probability distribution or a value such as an average is stored, for example, as information indicating a probabilistic communication data amount.

Subsequently, the complementing unit 11 generates complemented node information by adding information indicating the acquired complementing information "communication amount" to the first node information "10.20.2.109:1543" and "52.230.80.159:https".

Furthermore, in the complementing model 31 illustrated in FIG. 4, key information "db_child *" with a regular expression and complementing information "db_parent *" with a regular expression are stored in association with one another. The key information "db_child *" is node information indicating a process name. The complementing information "db_parent *" is node information indicating the name of a parent process of the process "db_child *".

However, such a relationship between a child process and a parent process can also be detected using the later-described link estimating model.

The estimating unit 12 estimates the probability of a link being present between nodes by inputting the complemented node information to the link estimating model 32.

Specifically, first, the estimating unit 12 acquires the complemented node information from the complementing unit 11. Next, the estimating unit 12 estimates the probability of a link being present between complemented node information nodes by referring to the link estimating model 32 (link estimating models 32a and 32b) using the complemented node information.

An example of the estimating unit will be described.

Suppose that, first, the monitoring command executing unit 13 inputs the "ps" command as the monitoring command 23 to the hosts 21, and the acquiring unit 14 acquires process-related information as illustrated in FIG. 5. FIG. 5 is a diagram for describing one example of information acquired using the monitoring command.

In such a case, first, the complementing unit 11 extracts information relating to "db_child1242" as the first node information from the information illustrated in FIG. 5. Next, the complementing unit 11 generates complemented node information by adding complementing information "db_parent" to the extracted first node information "db_child1242" based on the complementing model 31.

Next, the estimating unit 12 detects node IDs relating to "db_parent" and "db_child1242" by referring to a link estimating model 32a illustrated in FIG. 6 using "db_parent" and "db_child1242" in the complemented node information as keys. FIG. 6 is a diagram for describing one example of the link estimating model.

In the example illustrated in FIG. 6, in file-related information, information "node ID" for identifying the node, a path name "path", and a file name "file name" are stored in association with one another. Furthermore, in file-related information, information such as an access start date/time, an access end date/time, a file name, a path name, an owner ID, a group ID, a bus, a media type, and an operation type (e.g., copy, move, delete, etc.) are stored in association with the node ID.

Also, in the example illustrated in FIG. 6, in network-related information, information "node ID" for identifying the node, a transmission source IP address "transmission source IP", a transmission source port "transmission source port", a destination IP address "destination IP", and a destination port "destination port" are stored in association with one another. Furthermore, in network-related information, information such as an access start data/time, an access end date/time, an access type (transmission or reception), and a communication data amount are stored in association with the node ID.

Also, in the example illustrated in FIG. 6, in process-related information, information "node ID" for identifying the node and a process name "process name" are stored in association with one another. Furthermore, in process-related information, information such as an access start date/time, an access end date/time, a process ID, an owner ID, a group ID, an executed file name, a path name, command-line arguments, a parent-side process ID, a child-side process ID, a bus, a binary, a media type, and an operation type are stored in association with the node ID.

Note that the link estimating model 32a is generated using the later-described testing system and model generation apparatus.

Then, suppose that the estimating unit 12 detects "E3" and "E4" as the node IDs of "db_parent" and "db_child1242", respectively.

Next, the estimating unit 12 detects link information indicating a link between nodes that may relate to the detected node IDs "E3" and "E4" by referring to a link estimating model 32b illustrated in FIG. 7 using the detected node IDs "E3" and "E4" as keys. FIG. 7 is a diagram for describing one example of the link estimating model.

The link estimating model 32b includes one or more pieces of link information in which information identifying a link, pieces of information respectively identifying the relevant nodes, information indicating a link between nodes, information indicating the type of the link, and information indicating the probability of the link being present when the testing system is normally operated are associated with one another.

In the example illustrated in FIG. 7, each piece of link information includes information in which information "link ID" identifying a link, a parent-side node ID "node ID1" for identifying a parent-side node, a child-side node ID "node ID2" for identifying a child-side node, information "link type" indicating the type of the link, and information "presence probability" indicating the probability of the link being present are associated with one another, etc.

A node ID1 "E3", a node ID2 "E4", a link type "A1", and a presence probability "P1" are associated with a link ID "L1" in FIG. 7.

In the example illustrated in FIG. 7, the estimating unit 12 acquires the link information relating to the link ID "L1" because "E3" and "E4" are present in the link information for the link ID "L1".

For example, the link type is information indicating the data transmission relationship between processes, information indicating the relationship between a process and a file that the process accesses, etc. For example, the data transmission relationship between processes is a data transmission relationship between hosts, a data transmission relationship between a host and a process, etc. For example, the relationship between a process and a file that the process accesses is the opening, closing, reading, writing, generating, deleting, etc., of the file. Furthermore, information indicating the following may be adopted as the link type: a direction indicating the master-slave relationship between nodes; the date/time when a relationship was established; the number of times connection has been established; a data amount; the access frequency; etc. Furthermore, besides data communication, examples of the link type between processes include an occurrence relationship indicating that a child process was launched by a parent process, etc.

Note that the link estimating model 32b is generated using the later-described testing system and model generation apparatus.

The graph generating unit 15 generates graph information based on estimated link information. Specifically, first, the graph generating unit 15 acquires estimated link information. Next, the graph generating unit 15 generates graph information 81 as illustrated in FIG. 8 based on the estimated link information. Subsequently, the graph generating unit 15 outputs the graph information 81 to the abnormality determining unit 17. FIG. 8 is a diagram for describing one example of the graph information.

The graph information is a graph indicating relationships between nodes. As illustrated in FIG. 8, the graph information is information in which information "vertex" obtained by expressing a node as a vertex and information "edges" obtained by expressing links between nodes as edges are associated with one another. Note that an edge is set for each type of link.

In the example illustrated in FIG. 8, an edge "L0" indicating a link between vertices "E1" and "E2", an edge "L1" indicating a link between vertices "E1" and "E3", and an edge "L3" indicating another link between the vertices "E1" and "E3" are associated with the vertex "P1".

Also, the edge "L0" indicating the link between the vertices "E2" and "E1" and an edge "L2" indicating a link between the vertices "E2" and "E3" are associated with the vertex "E2".

Furthermore, the edge "L1" indicating the link between the vertices "E3" and "E1", the edge "L3" indicating another link between the vertices "E3" and "E1", and the edge "L2" indicating the link between the vertices "E3" and "E2" are associated with the vertex "E3".

Note that "edges" is left blank for a vertex where there is no link between nodes. In the example illustrated in FIG. 8, "edges" is left blank for a vertex "E4" because there is no link between nodes at the vertex "E4".

Figure 9:
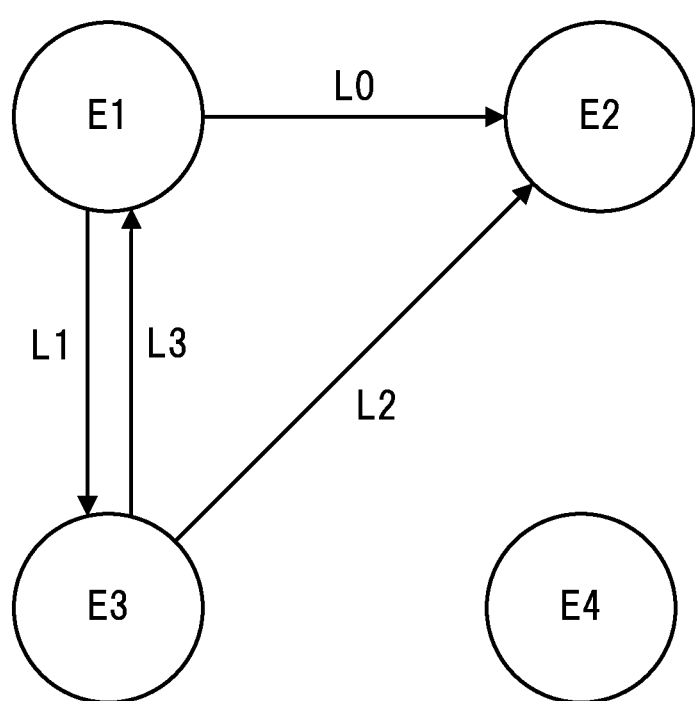
FIG. 9 is a diagram for describing the concept of the graph information.

FIG. 9 is a diagram for describing the concept of the graph information. In FIG. 9, vertices are illustrated as circles, and edges are illustrated as line segments connecting circles.

The reference link generating unit 16 generates the reference link model 33 based on the estimated link information. Specifically, first, the reference link generating unit 16 acquires the estimated link information. Next, the reference link generating unit 16 generates the reference link model 33 based on the estimated link information thus acquired.

The reference link model 33 is information having the same data structure as the link estimating model 32 generated with respect to the testing system 40. Furthermore, the reference link model includes one or more pieces of link information. Note that, in the following, link information in the reference link model is referred to as reference link information.

Reference link information includes information in which information identifying a link, pieces of information respectively identifying the relevant nodes, information indicating a link between nodes, information indicating the type of the link, and information indicating the probability of the link being present when the operated system is operated are associated with one another, etc.

Note that it is desirable that the link estimating model 32 be used as an initial model for the reference link model 33 and be trained to learn the links between nodes in the operated system 20.

Note that the graph generating unit 15 and the reference link generating unit 16 are provided for the following reason; because original software, etc., developed by the user operating the operated system 20 cannot be prepared in the testing system 40, the graph information is generated in the operated system 20, and abnormality determination is performed based on the graph information.

Using link information indicating an estimated link between nodes, the abnormality determining unit 17 refers to the reference link model 33 generated in the operated system 20 and selects reference rule information included in the reference link model 33 that corresponds to the link information. Subsequently, the abnormality determining unit 17 determines that the link information is abnormal if the presence probability in the selected reference rule information does not satisfy a preset condition.

Specifically, first, the abnormality determining unit 17 acquires link information from the estimating unit 12. Next, using the acquired link information as a key, the abnormality determining unit 17 refers to the reference link model 33 generated in the operated system 20 and selects reference rule information included in the reference link model 33. Subsequently, the abnormality determining unit 17 determines that the link information is abnormal if the presence probability in the selected reference rule information is equal to or less than a preset threshold. For example, the threshold is set through experimentation, simulation, etc.

Next, the abnormality determining unit 17 outputs the abnormality detection result to an unillustrated output information generating unit. Then, the output information generating unit generates output information to be used to output the abnormality detection result to an output device. The output device acquires the output information converted into an outputtable format by the output information generating unit, and outputs a generated image, audio, etc., based on the output information.

For example, the output device is an image display device in which liquid crystal, organic electroluminescence (organic EL), or a cathode ray tube (CRT) is used, or the like. Furthermore, the image display device may include an audio output device such as one or more speakers, etc. Note that the output device may be a printing device such as a printer.

The generation of the complementing model and the link estimating model will be described.

Figure 10:
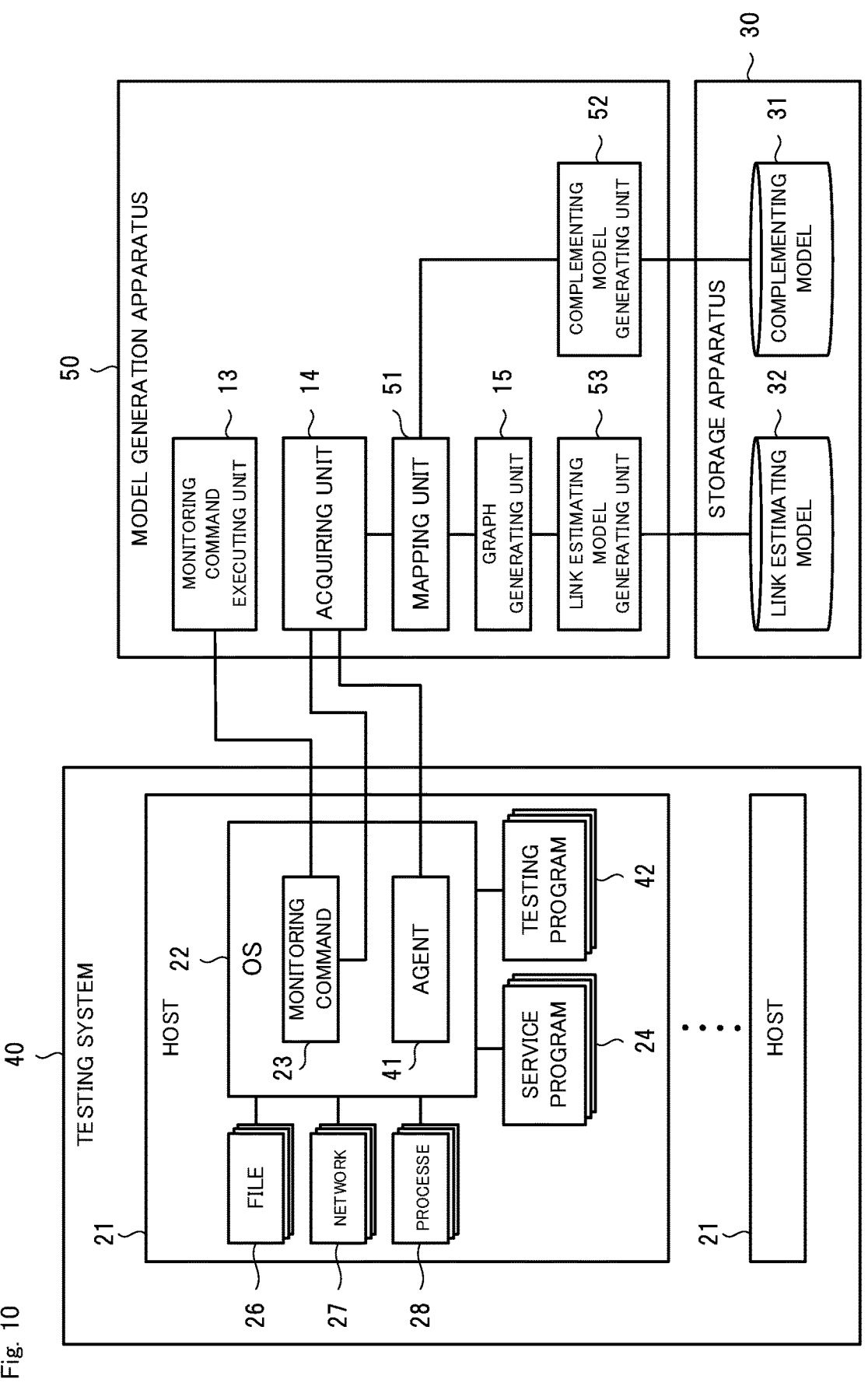
FIG. 10 is a diagram for describing one example of the model generation apparatus.

FIG. 10 is a diagram for describing one example of the model generation apparatus. The testing system 40 illustrated in FIG. 10 is a system simulating the operated system illustrated in FIG. 2. A model generation apparatus 50 generates the complementing model 31 and the link estimating model 32.

The testing system will be described.

The testing system 40 includes a plurality of hosts 21. In each of the hosts 21, an agent 41 and testing programs 42 are installed.

The agent 41 monitors the relationships between nodes in the testing system 40. The agent 41 transmits information indicating the relationships between nodes to the model generation apparatus 50.

In regard to files, the agent 41 collects information such as an access start date/time, an access end date/time, a file name, a path name, an owner ID, a group ID, a bus, a media type, and an operation type (e.g., copy, move, delete, etc.).

In regard to networks, the agent 41 collects information such as an access start data/time, an access end date/time, a transmission source IP, a transmission source port, a destination IP, a destination port, an access type (transmission or reception), and a communication data amount.

In regard to processes, the agent 41 collects information such as an access start date/time, an access end date/time, a process name, a process ID, an owner ID, a group ID, an executed file name, a path name, command-line arguments, a parent-side process ID, a child-side process ID, a bus, a binary, a media type, and an operation type.

If the testing system 40 is a social network, the agent 41 monitors emails on an email server. For example, the agent 41 monitors emails exchanged between users, and transmits an email transmission/reception log to the model generation apparatus 50.

The testing programs 42 are programs that are expected to be used in the operated system 20. Thus, it is desirable that the testing programs 42 include all of the user programs 25.

The model generation apparatus will be described.

The model generation apparatus 50 includes the monitoring command executing unit 13, the acquiring unit 14, the graph generating unit 15, a mapping unit 51, a complementing model generating unit 52, and a link estimating model generating unit 53.

For example, the model generation apparatus 50 is a CPU, a programmable device such as an FPGA, a GPU, or a circuit or an information processing apparatus, such as a server computer, a personal computer, or a mobile terminal, having one or more of the above mounted thereon.

Because the monitoring command executing unit 13, the acquiring unit 14, and the graph generating unit 15 have already been described, description thereof will be omitted.

Using second node information collected in the testing system 40 using the monitoring command 23 and third node information collected in the testing system 40 using the agent 41, the mapping unit 51 maps the second node information and the third node information to one another.

Specifically, first, the mapping unit 51 acquires the second node information and the third node information from the acquiring unit 14. Next, the mapping unit 51 learns the acquired second node information and the acquired third node information in the same event using the parameters of the acquired information as multi-dimensional elements, and performs clustering.

Figure 11:
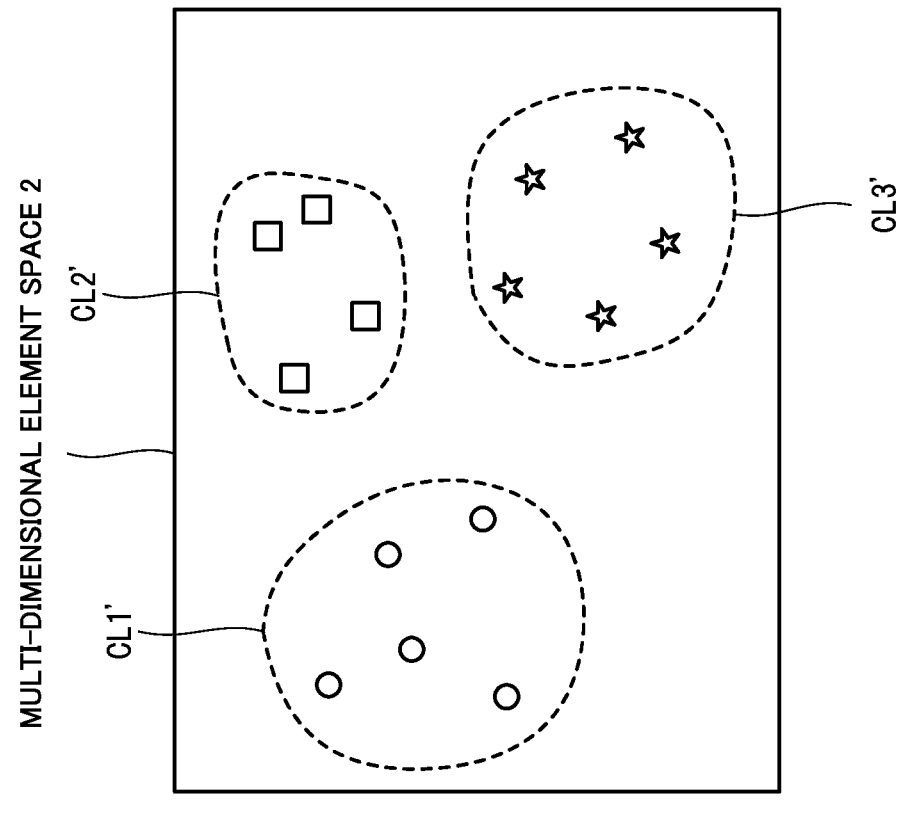
FIG. 11 is a diagram for describing the mapping.
Figure 11:
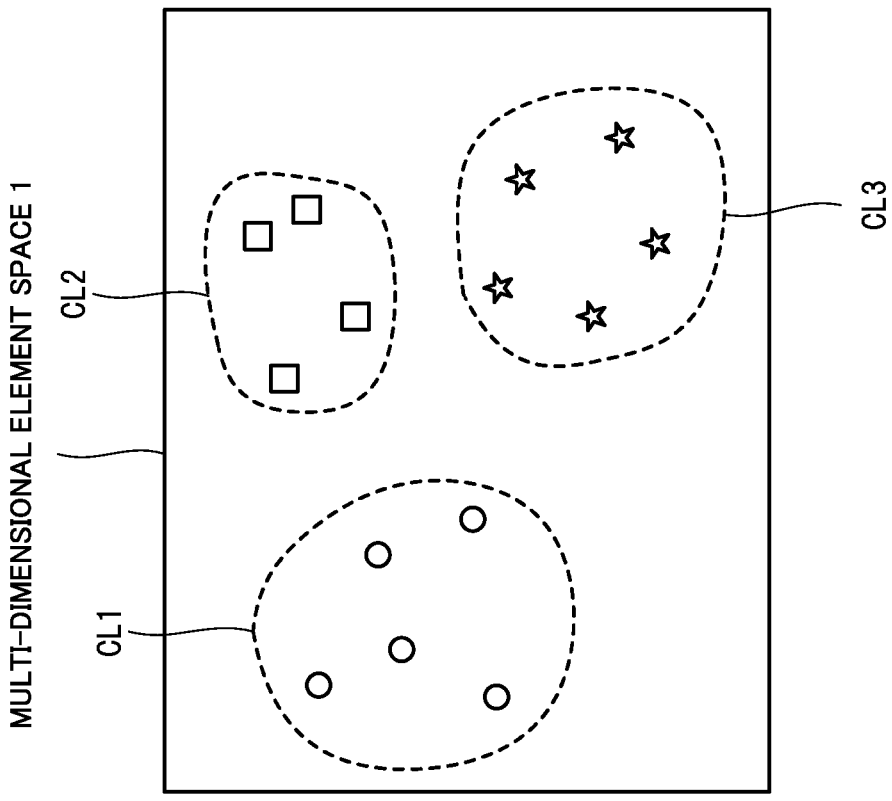

Consequently, because learning has been performed in the same event, the clustering results of the second node information in a multi-dimensional element space and the clustering results of the third node information in a multi-dimensional element space turn out to be similar, as illustrated in FIG. 11. FIG. 11 is a diagram for describing the mapping.

Here, learning using the k-nearest neighbor algorithm (KNN), a decision tree, a support vector machine (SVM), or the like is conceivable as the learning method.

Next, using a cluster from the second node information (cluster in a multi-dimensional element space 1) and a cluster from the third node information (cluster in a multi-dimensional element space 2) that corresponds to the cluster from the second node information, the mapping unit 51 associates nodes included in the clusters with each other (performs mapping). For example, because a cluster CL1 from the second node information and a cluster CL1' from the third node information correspond to one another, the mapping unit 51 generates mapping information by associating nodes included in these two clusters with one another.

The complementing model generating unit 52 generates the complementing model 31 based on the mapping information. Specifically, the complementing model generating unit 52 generates the complementing model 31 by detecting a common portion and variable portions from a plurality of events.

Specifically, first, the complementing model generating unit 52 acquires the mapping information from the mapping unit 51. Next, the complementing model generating unit 52 generates a complementing model 31 as illustrated in FIG. 4 using the acquired mapping information, and stores the complementing model 31 to the storage apparatus 30.

For example, if process names such as "db_child1234", "db_child5678", . . . which have the portion "db_child" in common and in which four-digit numerical values follow "db_child", frequently occur, a parameter that "db_child1234", "db_child5678", . . . have in common is detected by generating a regular expression key "db_child¥d{4}" matching therewith. One example of complementing information is the parent process name "db_parent".

The complementing model 31 is information in which information "key information" that serves as a key and that is field information with a regular expression, and information "complementing information" with a regular expression that is for complementing first node information are associated with one another.

The link estimating model generating unit 53 generates the link estimating model 32 using graph information generated based on the mapping information.

Specifically, first, the link estimating model generating unit 53 acquires graph information generated by the graph generating unit 15. Here, the graph generating unit 15 generates the graph information by using the mapping information as input.

Next, the link estimating model generating unit 53 generates a link estimating model 32 (link estimation models 32a and 32b) as illustrated in FIGS. 6 and 7, based on the graph information generated by the graph generating unit 15.

[Apparatus Operations]

Figure 12:
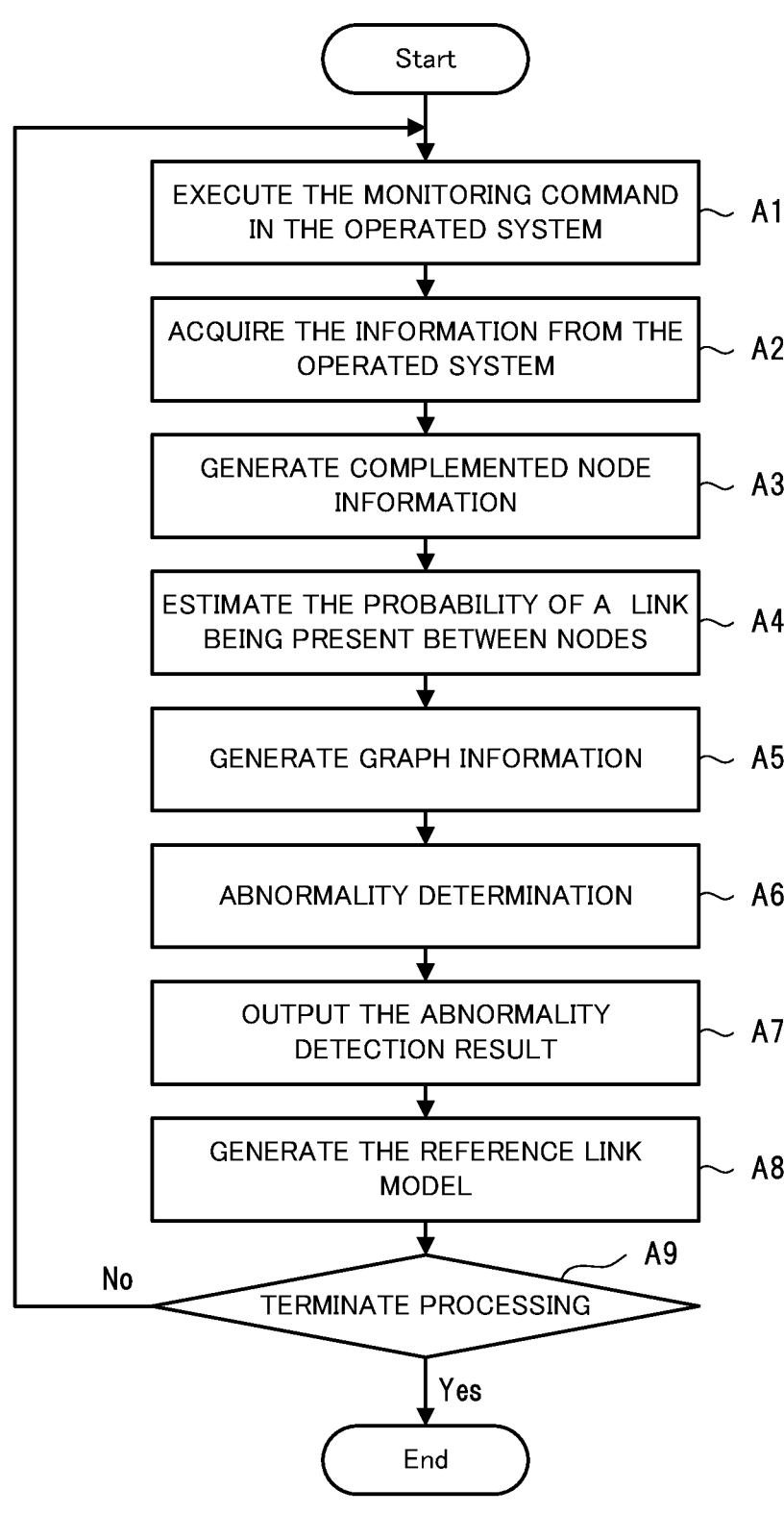
FIG. 12 is a diagram for describing one example of operations performed by the system monitoring apparatus.
Figure 13:
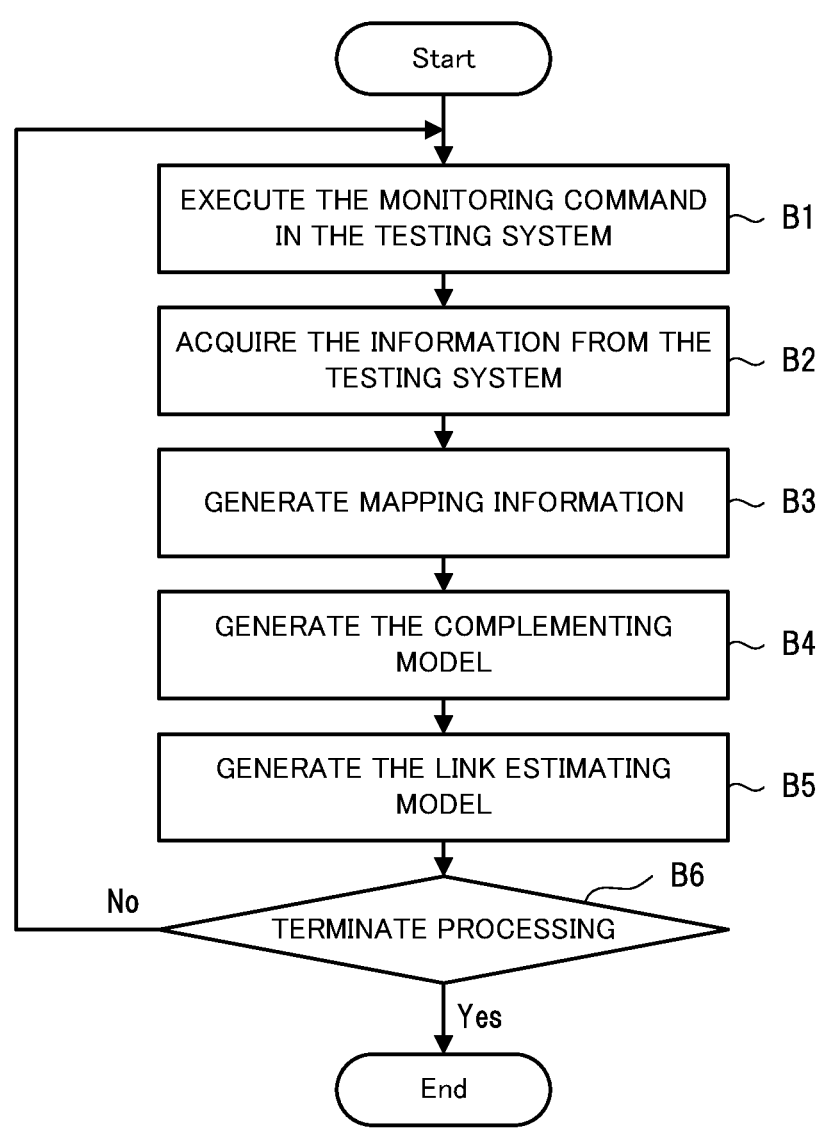
FIG. 13 is a diagram for describing one example of operations performed by the model generation apparatus.

Next, operations of the system monitoring apparatus 10 and the model generation apparatus 50 in the example embodiment of the invention will be described. FIG. 12 is a diagram for describing one example of operations performed by the system monitoring apparatus. FIG. 13 is a diagram for describing one example of operations performed by the model generation apparatus.

The drawings will be referred to as needed in the following description. In the present example embodiment, a system monitoring method is implemented by causing the system monitoring apparatus to operate. Accordingly, the following description of the operations performed by the system monitoring apparatus is substituted for the description of the system monitoring method in the present example embodiment.

Furthermore, in the present example embodiment, a model generation method is implemented by causing the model generation apparatus to operate. Accordingly, the following description of the operations performed by the model generation apparatus is substituted for the description of the model generation method in the present example embodiment.

Operations of the system monitoring apparatus will be described.

As illustrated in FIG. 12, the monitoring command executing unit 13 inputs a predetermined monitoring command 23 to the hosts 21 in the operated system 20 at a preset interval or a preset date/time, and thereby causes the OS 22 to execute a program executed by the predetermined monitoring command (step A1).

Next, the acquiring unit 14 acquires, from the hosts 21, the information collected in response to execution of the monitoring command 23 (step A2).

Next, the complementing unit 11 generates complemented node information by selecting complementing information for complementing the first node information from the complementing model 31, and adding the complementing information to the first node information (step A3).

Specifically, in step A3, the complementing unit 11 first acquires information including the first node information from the acquiring unit 14. Next, the complementing unit 11 extracts the first node information. Subsequently, the complementing unit 11 selects complementing information relating to the extracted first node information from the complementing model 31.

Next, the complementing unit 11 generates complemented node information by adding the complementing information to the extracted first node information.

The estimating unit 12 estimates the probability of a link being present between nodes by inputting the complemented node information to the link estimating model 32 (step A4).

Specifically, in step A4, the estimating unit 12 first acquires the complemented node information from the complementing unit 11. Next, the estimating unit 12 estimates the probability of a link being present between complemented node information nodes by referring to the link estimating model 32 (link estimating models 32*a* and 32*b*) using the complemented node information.

The graph generating unit 15 generates graph information based on estimated link information (step A5). Specifically, in step A5, the graph generating unit 15 first acquires estimated link information. Next, the graph generating unit 15 generates graph information 81 as illustrated in FIG. 8 based on the estimated link information thus acquired. Subsequently, the graph generating unit 15 outputs the graph information 81 to the abnormality determining unit 17.

Using link information indicating an estimated link between nodes, the abnormality determining unit 17 refers to the reference link model 33 generated in the operated system 20 to select reference rule information included in the reference link model 33 that corresponds to the link information, and determines that the link information is abnormal if the presence probability in the selected reference rule information does not satisfy a preset condition (step A6).

Specifically, in step A6, the abnormality determining unit 17 first acquires link information from the estimating unit 12. Next, using the acquired link information as a key, the abnormality determining unit 17 refers to the reference link model 33 generated in the operated system 20 and selects reference rule information included in the reference link model 33.

Subsequently, the abnormality determining unit 17 determines that the link information is abnormal if the presence probability in the selected reference rule information is equal to or less than a preset threshold. For example, the threshold is set through experimentation, simulation, etc.

Next, the abnormality determining unit 17 outputs the abnormality detection result to an unillustrated output information generating unit (step A7). Then, the output information generating unit generates output information to be used to output the abnormality detection result to an output device. The output device acquires the output information converted into an outputtable format by the output information generating unit, and outputs a generated image, audio, etc., based on the output information.

Next, the reference link generating unit 16 generates the reference link model 33 based on the estimated link information (step A8). Specifically, in step A8, the reference link generating unit 16 first acquires the estimated link information. Next, the reference link generating unit 16 generates the reference link model 33 based on the estimated link information thus acquired.

Note that it is desirable that the link estimating model 32 be used as an initial model for the reference link model 33 and be trained to learn the links between nodes in the operated system 20.

Next, the system monitoring apparatus 10 terminates the above-described system monitoring processing upon acquiring an instruction to terminate the system monitoring processing (step A9: Yes). Furthermore, if the system monitoring processing is to be continued (step A9: No), the system monitoring apparatus 10 moves on to step A1 and continues the processing.

Operations of the model generation apparatus will be described.

As illustrated in FIG. 13, the monitoring command executing unit 13 inputs a predetermined monitoring command 23 to the hosts 21 in the testing system 40 at a preset interval or a preset date/time, and thereby causes the OS 22 to execute a program executed by the predetermined monitoring command (step B1).

Next, the acquiring unit 14 acquires, from the hosts 21, information collected in response to execution of the monitoring command 23 (step B2).

Next, using second node information collected in the testing system 40 using the monitoring command 23 and third node information collected in the testing system 40 using the agent 41, the mapping unit 51 generates mapping information (step B3).

Specifically, in step B3, the mapping unit 51 first acquires the second node information and the third node information from the acquiring unit 14. Next, the mapping unit 51 learns the acquired second node information and the acquired third node information in the same event using the parameters of the acquired information as multi-dimensional elements, and performs clustering.

Consequently, because learning has been performed in the same event, the clustering results of the second node information in a multi-dimensional element space and the clustering results of the third node information in a multi-dimensional element space turn out to be similar, as illustrated in FIG. 11.

Next, using a cluster from the second node information (cluster in a multi-dimensional element space 1) and a cluster from the third node information (cluster in a multi-dimensional element space 2) that corresponds to the cluster from the second node information, the mapping unit 51 associates nodes included in the clusters with each other (performs mapping).

For example, because a cluster CL1 from the second node information and a cluster CL1' from the third node information correspond to one another, the mapping unit 51 generates mapping information by associating nodes included in these two clusters with one another.

Next, the complementing model generating unit 52 generates the complementing model 31 based on the mapping information (step B4). Specifically, in step B4, the complementing model generating unit 52 first acquires the mapping information from the mapping unit 51. Next, the complementing model generating unit 52 generates a complementing model 31 as illustrated in FIG. 4 using the acquired mapping information, and stores the complementing model 31 to the storage apparatus 30.

Next, the link estimating model generating unit 53 generates the link estimating model 32 using graph information generated based on the mapping information (step B5).

Specifically, in step B5, the link estimating model generating unit 53 first acquires graph information generated by the graph generating unit 15. Here, the graph generating unit 15 generates the graph information by using the mapping information as input.

Next, the link estimating model generating unit 53 generates a link estimating model 32 (link estimation models 32*a* and 32*b*) as illustrated in FIGS. 6 and 7 based on the graph information generated by the graph generating unit 15.

Next, the system monitoring apparatus 10 terminates the above-described model generation processing upon acquiring an instruction to terminate the model generation processing (step B6: Yes). Furthermore, if the model generation processing is to be continued (step B6: No), the system monitoring apparatus 10 moves on to step B1 and continues the processing.

Effects of Embodiment

As described above, according to the present example embodiment, the first node information collected from the operated system using the monitoring command, without using an agent and accessing an OS kernel module, can be expanded to information equivalent to node information collected using an agent.

In addition, in the present example embodiment, the probability of a link being present between nodes can be estimated using the complemented node information obtained by expanding the first node information, which is collected from the operated system using the monitoring command, without using an agent and accessing an OS kernel module.

Furthermore, because an agent affecting a kernel does not need to be operated in the operated system, processing load and system operation instability caused by an agent can be avoided.

[Program]

The program according to an embodiment of the present invention may be a program that causes a computer to execute steps A1 to A9 shown in FIG. 12. By installing this program in a computer and executing the program, the system monitoring apparatus and the system monitoring method according to the present example embodiment can be realized. In this case, the processor of the computer performs processing to function as the monitoring command executing unit 13, the acquiring unit 14, the complementing unit 11, the estimating unit 12, the graph generating unit 15, the reference link generating unit 16, the abnormality determining unit 17, and the output information generating unit.

Also, the program according to the present embodiment may be executed by a computer system constructed by a plurality of computers. In this case, for example, each computer may function as any of the monitoring command executing unit 13, the acquiring unit 14, the complementing unit 11, the estimating unit 12, the graph generating unit 15, the reference link generating unit 16, the abnormality determining unit 17, and the output information generating unit.

The program according to an embodiment of the present invention may be a program that causes a computer to execute steps B1 to B6 shown in FIG. 13. By installing this program in a computer and executing the program, the model generation apparatus and the model generation method according to the present example embodiment can be realized. In this case, the processor of the computer performs processing to function as the monitoring command executing unit 13, the acquiring unit 14, the graph generating unit 15, the mapping unit 51, the complementing model generating unit 52 and the link estimating model generating unit 53.

Also, the program according to the present embodiment may be executed by a computer system constructed by a plurality of computers. In this case, for example, each computer may function as any of the monitoring command executing unit 13, the acquiring unit 14, the graph generating unit 15, the mapping unit 51, the complementing model generating unit 52 and the link estimating model generating unit 53.

[Physical Configuration]

Figure 14:
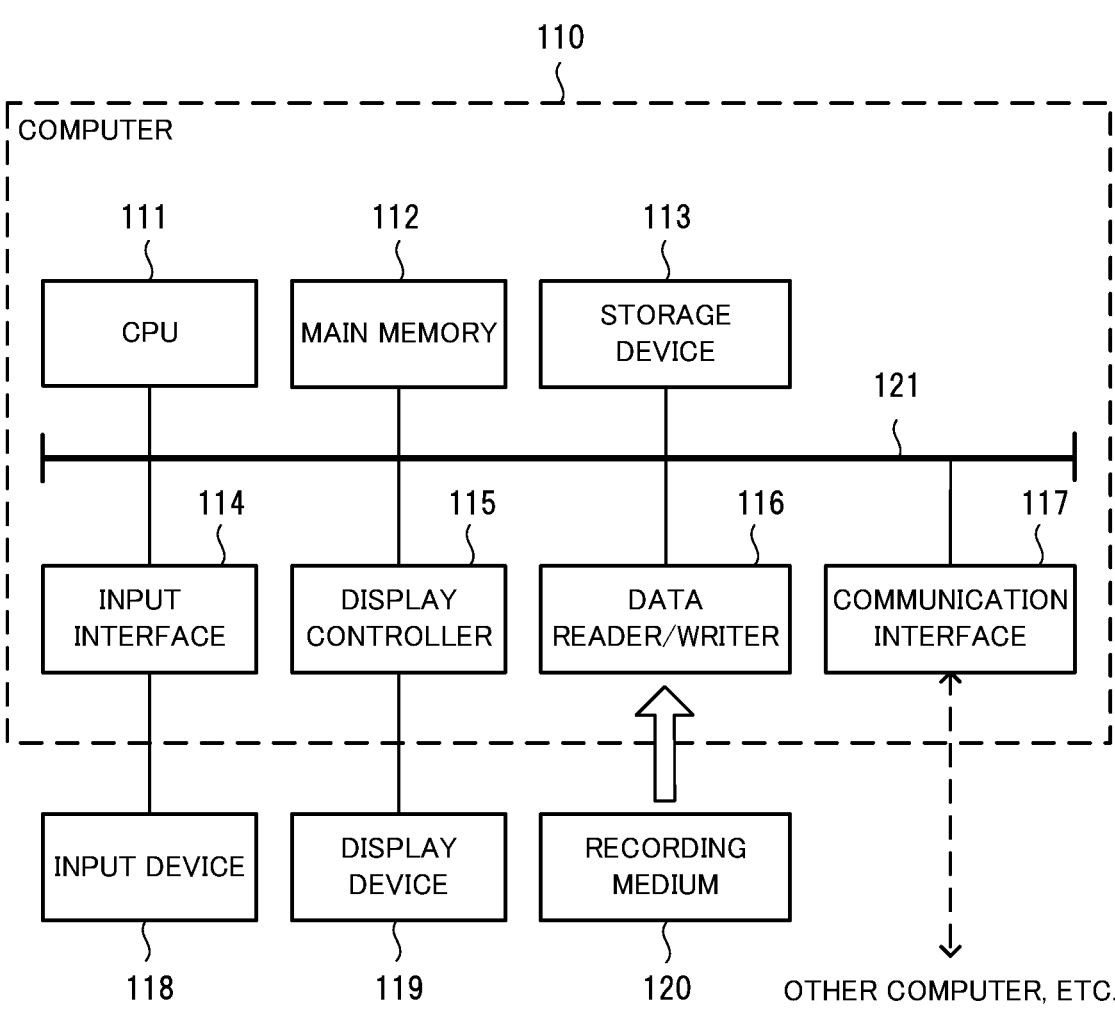
FIG. 14 is a block diagram showing an example of a computer that realizes the system monitoring apparatus and the model generation apparatus.

Here, a computer that realizes the system monitoring apparatus and the model generation apparatus by executing the program according to an example embodiment will be described with reference to FIG. 14. FIG. 14 is a block diagram showing an example of a computer that realizes the search support apparatus according to an example embodiment of the present invention.

As shown in FIG. 14, a computer 110 includes a CPU (Central Processing Unit) 111, a main memory 112, a storage device 113, an input interface 114, a display controller 115, a data reader/writer 116, and a communications interface 117. These units are each connected so as to be capable of performing data communications with each other through a bus 121. Note that the computer 110 may include a GPU (Graphics Processing Unit) or an FPGA (Field-Programmable Gate Array) in addition to the CPU 111 or in place of the CPU 111.

The CPU 111 opens the program (code) according to this example embodiment, which has been stored in the storage device 113, in the main memory 112 and performs various operations by executing the program in a predetermined order. The main memory 112 is typically a volatile storage device such as a DRAM (Dynamic Random Access Memory). Also, the program according to this example embodiment is provided in a state being stored in a computer-readable recording medium 120. Note that the program according to this example embodiment may be distributed on the Internet, which is connected through the communications interface 117.

Also, other than a hard disk drive, a semiconductor storage device such as a flash memory can be given as a specific example of the storage device 113. The input interface 114 mediates data transmission between the CPU 111 and an input device 418, which may be a keyboard or mouse. The display controller 115 is connected to a display device 119, and controls display on the display device 119.

The data reader/writer 116 mediates data transmission between the CPU 111 and the recording medium 120, and executes reading of a program from the recording medium 120 and writing of processing results in the computer 110 to the recording medium 120. The communications interface 117 mediates data transmission between the CPU 111 and other computers.

Also, general-purpose semiconductor storage devices such as CF (Compact Flash (registered trademark)) and SD (Secure Digital), a magnetic recording medium such as a Flexible Disk, or an optical recording medium such as a CD-ROM (Compact Disk Read-Only Memory) can be given as specific examples of the recording medium 120.

Also, instead of a computer in which a program is installed, the system monitoring apparatus 10 and the model generation apparatus 50 according to this example embodiment can also be realized by using hardware corresponding to each unit. Furthermore, a portion of the system monitoring apparatus 10 and the model generation apparatus 50 may be realized by a program, and the remaining portion realized by hardware.

[Supplementary Notes]

Furthermore, the following supplementary notes are disclosed regarding the example embodiments described above. Some portion or all of the example embodiments described above can be realized according to (supplementary note 1) to (supplementary note 12) described below, but the below description does not limit the present invention.

(Supplementary Note 1)

A system monitoring apparatus comprising:

a complementing unit that generates complemented node information by complementing, based on a complementing model trained using information collected in a testing system using a monitoring command and an agent, first node information collected in an operated system using the monitoring command; and an estimating unit that estimates the probability of a link being present between nodes by inputting the complemented node information to a link estimating model trained using the information collected in the testing system using the monitoring command and the agent.

(Supplementary Note 2)

The system monitoring apparatus according to Supplementary Note 1, wherein the complementing model includes one or more pieces of rule information generated by performing learning using second node information collected in the testing system using the monitoring command and third node information collected in the testing system using the agent, and in which key information serving as a key for selecting the first node information and complementing information for complementing the first node information are associated with one another.

(Supplementary Note 3)

The system monitoring apparatus according to Supplementary Note 1 or 2 further comprising an abnormality determining unit that, by using link information indicating an estimated link between nodes, referring to a reference link model generated in the operated system to select reference rule information included in the reference link model that corresponds to the link information, and determining that the link information is abnormal if the selected reference rule information does not satisfy a preset condition.

(Supplementary Note 4)

The system monitoring apparatus according to Supplementary Note 3, wherein the reference link model is generated using link information indicating links between nodes estimated in the past in the operated system.

(Supplementary Note 5)

A system monitoring method comprising:

a generating step of generating complemented node information by complementing, based on a complementing model trained using information collected in a testing system using a monitoring command and an agent, first node information collected in an operated system using the monitoring command; and an estimating step of estimating the probability of a link being present between nodes by inputting the complemented node information to a link estimating model trained using the information collected in the testing system using the monitoring command and the agent.

(Supplementary Note 6)

The system monitoring method according to Supplementary Note 5, wherein the complementing model includes one or more pieces of rule information generated by performing learning using second node information collected in the testing system using the monitoring command and third node information collected in the testing system using the agent, and in which key information serving as a key for selecting the first node information and complementing information for complementing the first node information are associated with one another.

(Supplementary Note 7)

The system monitoring method according to Supplementary Note 5 or 6 further comprising an abnormality determining step of, by using link information indicating an estimated link between nodes, referring to a reference link model generated in the operated system to select reference rule information included in the reference link model that corresponds to the link information, and determining that the link information is abnormal if the selected reference rule information does not satisfy a preset condition.

(Supplementary Note 8)

The system monitoring method according to Supplementary Note 7, wherein the reference link model is generated using link information indicating links between nodes estimated in the past in the operated system.

(Supplementary Note 9)

A computer readable recording medium that includes a program recorded thereon, the program including instructions that cause a computer to carry out:

a generating step of generating complemented node information by complementing, based on a complementing model trained using information collected in a testing system using a monitoring command and an agent, first node information collected in an operated system using the monitoring command; and an estimating step of estimating the probability of a link being present between nodes by inputting the complemented node information to a link estimating model trained using the information collected in the testing system using the monitoring command and the agent.

(Supplementary Note 10)

The computer readable recording medium according to Supplementary Note 9, wherein the complementing model includes one or more pieces of rule information generated by performing learning using second node information collected in the testing system using the monitoring command and third node information collected in the testing system using the agent, and in which key information serving as a key for selecting the first node information and complementing information for complementing the first node information are associated with one another.

(Supplementary Note 11)

The computer readable recording medium according to Supplementary Note 9 or 10 including the program recorded thereon, the program including instructions that cause the computer to carry out an abnormality determining step of, by using link information indicating an estimated link between nodes, referring to a reference link model generated in the operated system to select reference rule information included in the reference link model that corresponds to the link information, and determining that the link information is abnormal if the selected reference rule information does not satisfy a preset condition.

(Supplementary Note 12)

The computer readable recording medium according to Supplementary Note 11, wherein the reference link model is generated using link information indicating links between nodes estimated in the past in the operated system.

Although the present invention of this application has been described with reference to exemplary embodiments, the present invention of this application is not limited to the above exemplary embodiments. Within the scope of the present invention of this application, various changes that can be understood by those skilled in the art can be made to the configuration and details of the present invention of this application.

INDUSTRIAL APPLICABILITY

As described above, according to the present invention, it is possible to accurately monitoring a system without accessing a kernel module. The present invention is useful in fields where it is necessary to system monitoring.

REFERENCE SIGNS LIST

10 System monitoring apparatus
11 Complementing unit
12 Estimating unit
13 Monitoring command executing unit
14 Acquiring unit
15 Graph generating unit
16 Reference link generating unit
17 Abnormality determining unit
20 Operated system
21 Host
22 OS
23 Monitoring command
24 Service program
25 User program
26 File
27 Network
28 Process
30 Storage apparatus
31 Complementing model
32, 32a, 32b Link estimating model
33 Reference link model
40 Testing system
41 Agent
42 Testing program
50 Model generation apparatus
51 Mapping unit
52 Complementing model generating unit
53 Link estimating model generating unit
110 Computer
111 CPU
112 Main memory
113 Storage device
114 Input interface
115 Display controller
116 Data reader/writer
117 Communications interface
118 Input device
119 Display device
120 Recording medium
121 Bus

What is claimed is:

1. A system monitoring apparatus comprising:
one or more memories storing instructions; and
one or more processors configured to execute the instructions to:
input first node information to a complementing model, wherein:
the first node information is collected by using a monitoring command in an operated system, and
the complementing model has learned a relationship between second node information and third node information by using the second node information and the third node information,
wherein the second node information is collected by using the monitoring command, and
wherein the third node information is collected by an agent in a testing system;
output complemented node information instead of the first node information, the second node information, and the third node information; and
estimate a probability of a link being present between nodes by inputting the complemented node information to a link estimating model trained using information collected in the testing system using the monitoring command and the agent.

2. The system monitoring apparatus according to claim 1, wherein the complementing model includes one or more pieces of rule information generated by performing learning using the second node information collected in the testing system using the monitoring command and the third node information collected in the testing system using the agent, and in which key information serving as a key for selecting the first node information and complementing information for complementing the first node information are associated with one another.

3. The system monitoring apparatus according to claim 1, wherein the one or more processors is further configured to execute the instructions to,
by using link information indicating an estimated link between nodes, referring to a reference link model generated in the operated system to select reference rule information included in the reference link model that corresponds to the link information, and determine that the link information is abnormal if the selected reference rule information does not satisfy a preset condition.

4. The system monitoring apparatus according to claim 3, wherein the reference link model is generated using the link information indicating links between nodes estimated in the past in the operated system.

5. A system monitoring method comprising:
inputting first node information to a complementing model, wherein:
the first node information is collected by using a monitoring command in an operated system, and
the complementing model has learned a relationship between second node information and third node information by using the second node information and the third node information,
wherein the second node information is collected by using the monitoring command, and
wherein the third node information is collected by an agent in a testing system;
outputting complemented node information instead of the first node information, the second node information, and the third node information; and
estimating a probability of a link being present between nodes by inputting the complemented node information to a link estimating model trained using information collected in the testing system using the monitoring command and the agent.

6. The system monitoring method according to claim 5, wherein the complementing model includes one or more pieces of rule information generated by performing learning using the second node information collected in the testing system using the monitoring command and the third node information collected in the testing system using the agent, and in which key information serving as a key for selecting the first node information and complementing information for complementing the first node information are associated with one another.

7. The system monitoring method according to claim 5 further comprising
by using link information indicating an estimated link between nodes, referring to a reference link model generated in the operated system to select reference rule information included in the reference link model that corresponds to the link information, and determining that the link information is abnormal if the selected reference rule information does not satisfy a preset condition.

8. The system monitoring method according to claim 7, wherein the reference link model is generated using the link information indicating links between nodes estimated in the past in the operated system.

9. A non-transitory computer readable recording medium that includes a program recorded thereon, the program including instructions that cause a computer to carry out:

inputting first node information to a complementing model, wherein:

the first node information is collected by using a monitoring command in an operated system, and the complementing model has learned a relationship between second node information and third node information by using the second node information and the third node information, wherein the second node information is collected by using the monitoring command, and wherein the third node information is collected by an agent in a testing system;

outputting complemented node information instead of the first node information, the second node information, and the third node information; and estimating a probability of a link being present between nodes by inputting the complemented node information to a link estimating model trained using information collected in the testing system using the monitoring command and the agent.

10. The non-transitory computer readable recording medium according to claim 9, wherein the complementing model includes one or more pieces of rule information generated by performing learning using the second node information collected in the testing system using the monitoring command and the third node information collected in the testing system using the agent, and in which key information serving as a key for selecting the first node information and complementing information for complementing the first node information are associated with one another.

11. The non-transitory computer readable recording medium according to claim 9, wherein the program recorded thereon includes instructions that cause the computer to carry out by using link information indicating an estimated link between nodes, referring to a reference link model generated in the operated system to select reference rule information included in the reference link model that corresponds to the link information, and determining that the link information is abnormal if the selected reference rule information does not satisfy a preset condition.

12. The non-transitory computer readable recording medium according to claim 11, wherein the reference link model is generated using the link information indicating links between nodes estimated in the past in the operated system.

* * * * *